US012800532B2

(12) United States Patent
Akimoto et al.

(10) Patent No.: US 12,800,532 B2
(45) **Date of Patent: *Nov. 17, 2026**

(54) SENSOR AND SENSOR SYSTEM

(71) Applicant: KABUSHIKI KAISHA TOSHIBA, Tokyo (JP)

(72) Inventors: Yosuke Akimoto, Yokohama Kanagawa (JP); Akira Fujimoto, Kawasaki Kanagawa (JP); Yoshihiko Kurui, Chigasaki Kanagawa (JP); Ping Wang, Fujisawa Kanagawa (JP); Hiroaki Yamazaki, Yokohama Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 598 days.

This patent is subject to a terminal disclaimer.

(21) Appl. No.: 18/457,555

(22) Filed: Aug. 29, 2023

(65) Prior Publication Data

US 2024/0295514 A1 Sep. 5, 2024

(30) Foreign Application Priority Data

Mar. 2, 2023 (JP) ................................ 2023-032013

(51) Int. Cl.
*G01N 27/04* (2006.01)

(52) U.S. Cl.
CPC .................................. *G01N 27/04* (2013.01)

(58) Field of Classification Search
CPC ... G01N 27/04; G01N 27/045; G01N 33/0027
See application file for complete search history.

(56) References Cited

U.S. PATENT DOCUMENTS

2001/0020383 A1* 9/2001 Moos .................. G01N 27/123 73/31.06
2006/0211123 A1* 9/2006 Ker .................... G01N 33/0054 436/113

(Continued)

FOREIGN PATENT DOCUMENTS

EP 3 534 154 A1 9/2019
JP S58-158547 A 9/1983

(Continued)

OTHER PUBLICATIONS

Japan Patent Office, Office Action in JP App. No. 2023-032013 (Dec. 16, 2025).

*Primary Examiner* — Judy Nguyen
*Assistant Examiner* — Adam S Clarke
(74) *Attorney, Agent, or Firm* — Finnegan, Henderson, Farabow, Garrrett & Dunner, LLP

(57) ABSTRACT

According to one embodiment, a sensor includes an element section including a first base and a first element. The first element includes a first fixed member fixed to the first base, a first connecting member supported by the first fixed member, and a first film portion supported by the first connecting member. A first gap is provided between the first base and the first film portion. The first film portion includes a first resistance layer, a first conductive layer, and a first conductive member provided between the first resistance layer and the first conductive layer. A potential of the first conductive member is fixed. A first electrical resistance of the first resistance layer is configured to change according to a state of a detection target around the first element.

20 Claims, 3 Drawing Sheets

(56) References Cited

U.S. PATENT DOCUMENTS

| | | | | |
|---|---|---|---|---|
| 2021/0318282 | A1 | 10/2021 | Akimoto et al. | |
| 2022/0396471 | A1 | 12/2022 | Yamazaki | |
| 2023/0288270 | A1* | 9/2023 | Kurui | B81B 3/0051 |

FOREIGN PATENT DOCUMENTS

| | | | |
|---|---|---|---|
| JP | H5-18984 | A | 1/1993 |
| JP | H6-102227 | A | 4/1994 |
| JP | 2016-156623 | A | 9/2016 |
| JP | 2017-36935 | A | 2/2017 |
| JP | 2019-152451 | A | 9/2019 |
| JP | 2021-167766 | A | 10/2021 |
| JP | 2022-188341 | A | 12/2022 |

* cited by examiner

SENSOR AND SENSOR SYSTEM

CROSS-REFERENCE TO RELATED APPLICATIONS

This application is based upon and claims the benefit of priority from Japanese Patent Application No. 2023-032013, filed on Mar. 2, 2023; the entire contents of which are incorporated herein by reference.

FIELD

Embodiments described herein relate generally to a sensor and a sensor system.

BACKGROUND

For example, there are sensors that detect gases. It is desired to improve the characteristics of the sensor.

DETAILED DESCRIPTION

Figure 1:
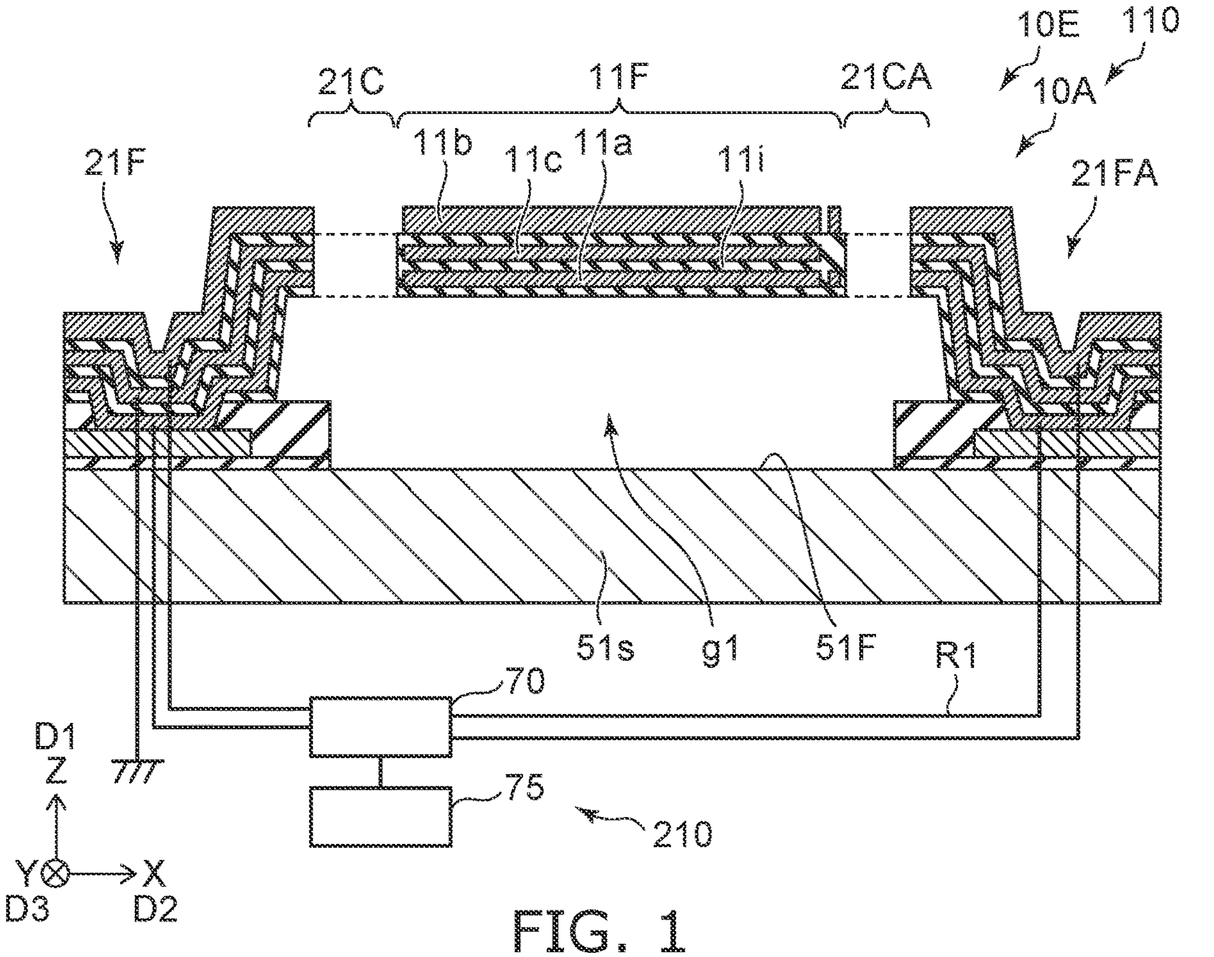
FIG. 1 is a schematic cross-sectional view illustrating a sensor according to a first embodiment.

According to one embodiment, a sensor includes an element section including a first base and a first element. The first element includes a first fixed member fixed to the first base, a first connecting member supported by the first fixed member, and a first film portion supported by the first connecting member. A second direction from the first fixed member to the first film portion crosses a first direction from the first base to the first fixed member. A first gap is provided between the first base and the first film portion. The first film portion includes a first resistance layer, a first conductive layer, and a first conductive member provided between the first resistance layer and the first conductive layer. A potential of the first conductive member is fixed. A first electrical resistance of the first resistance layer is configured to change according to a state of a detection target around the first element.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a sensor according to a first embodiment.

Figure 2A:
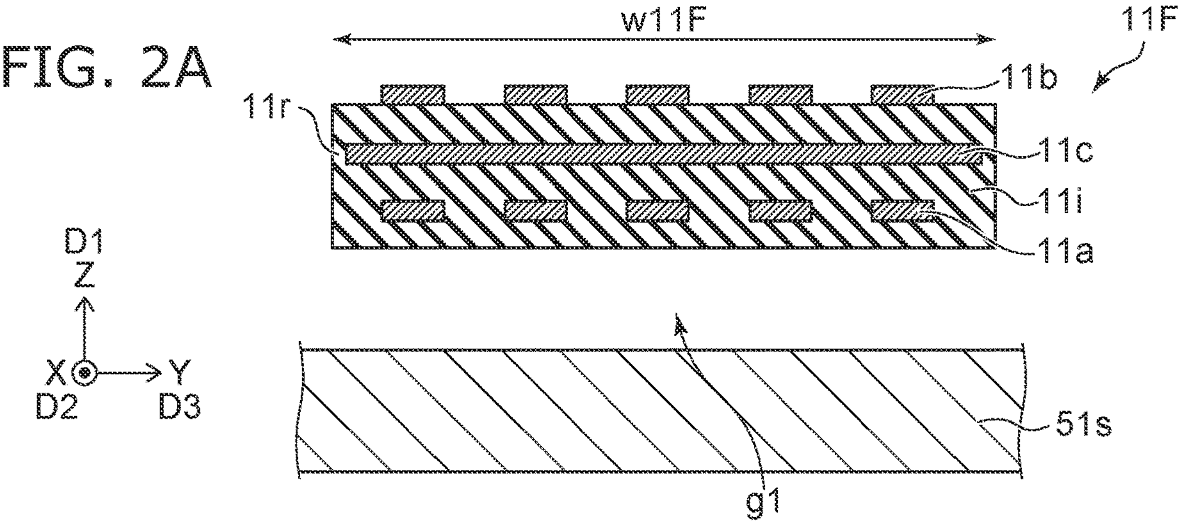
FIGS. 2A-2C are schematic cross-sectional views illustrating the sensor according to the first embodiment.
Figure 2B:
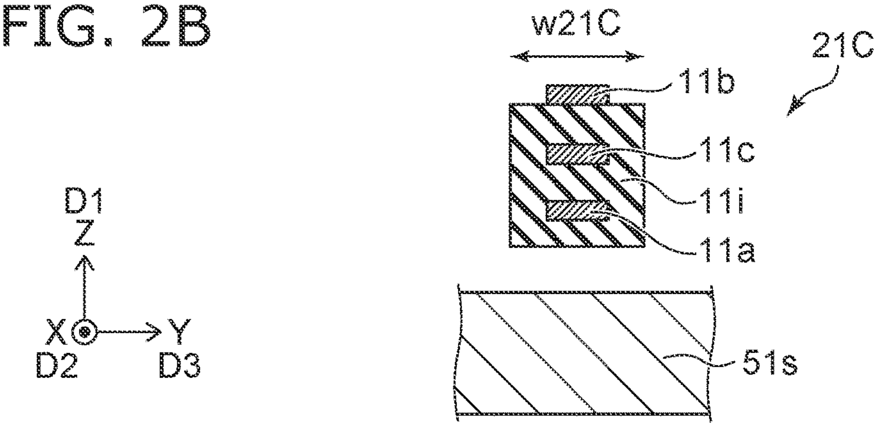
Figure 2C:
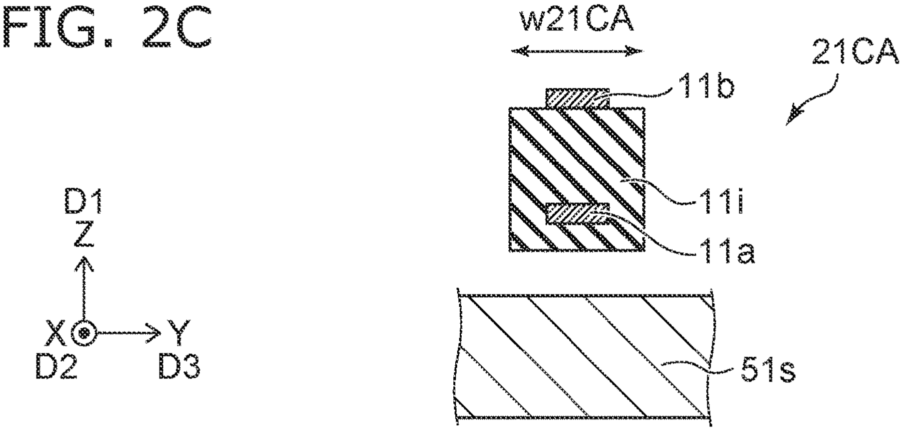

FIGS. 2A-2C are schematic cross-sectional views illustrating the sensor according to the first embodiment.

Figure 3:
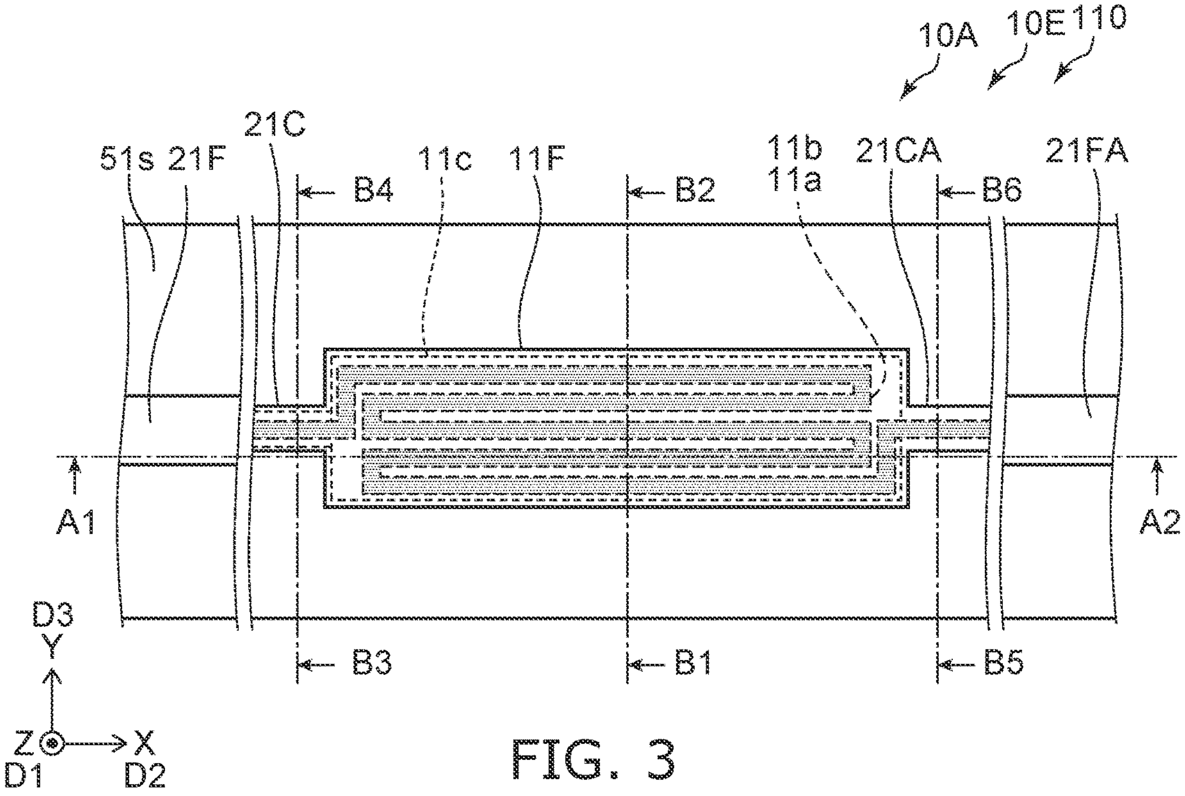
FIG. 3 is a schematic plan view illustrating the sensor according to the first embodiment.

FIG. 3 is a schematic plan view illustrating the sensor according to the first embodiment.

FIG. 1 is a cross-sectional view taken along the line A1-A2 in FIG. 3. FIG. 2A is a cross-sectional view taken along the line B1-B2 of FIG. 3. FIG. 2B is a cross-sectional view taken along the line B3-B4 of FIG. 3. FIG. 2C is a cross-sectional view along the line B5-B6 of FIG. 3.

As shown in FIGS. 1 and 3, a sensor 110 according to the embodiment includes an element section 10E. The element section 10E includes a first base 51*s* and a first element 10A. The first base 51*s* may include, for example, a silicon substrate. The first base 51*s* may include electronic circuits such as transistors.

The first element 10A includes a first fixed member 21F fixed to the first base 51*s*, a first connecting member 21C supported by the first fixed member, and a first film portion 11F supported by the first connecting member 21C.

A first direction D1 from the first base 51*s* to the first fixed member 21F is defined as a Z-axis direction. One direction perpendicular to the Z-axis direction is defined as an X-axis direction. A direction perpendicular to the Z-axis direction and the X-axis direction is defined as a Y-axis direction.

For example, the first base 51*s* includes a first face 51F. The first face 51F extends along the X-Y plane. The first fixed member 21F is fixed to the first face 51F.

A second direction D2 from the first fixed member 21F to the first film portion 11F crosses the first direction D1. The second direction D2 is, for example, the X-axis direction.

As shown in FIG. 1, a first gap g1 is provided between the first base 51*s* and the first film portion 11F.

As shown in FIG. 1, the first film portion 11F includes a first resistance layer 11*a*, a first conductive layer 11*b*, and a first conductive member 11*c*. The first conductive member 11*c* is provided between the first resistance layer 11*a* and the first conductive layer 11*b*.

The potential of the first conductive member 11*c* is fixed. The first conductive member 11*c* is set to, for example, a ground potential (GND potential).

A first electrical resistance R1 of the first resistance layer 11*a* changes depending on the state of the detection target around the first element 10A.

As shown in FIG. 1, in the sensor 110, a controller 70 may be provided. The controller 70 may be included in sensor 110. The controller 70 may be provided separately from the sensor 110. The controller 70 is configured to supply first electric power to the first conductive layer 11*b* and to detect the first electrical resistance R1. The supply of the first electric power increases the temperature of the first film portion 11F. The heat of the first film portion 11F, for example, propagates from the first film portion 11F to its surroundings. A part of the heat passes through the first gap g1 and propagates to the first base 51*s*. Another part of the heat propagates upward through the first film portion 11F.

For example, heat propagation (heat dissipation) changes depending on the state of the detection target around the first element 10A. The detection target is, for example, gas. For example, the thermal conductivity of the gas around the first element 10A depends on the elements (and/or molecules) included in the gas and their concentrations. The heat dissipation property changes depending on the state of the detection target (type and concentration of the gas), and as a result, the first electrical resistance R1 of the first resistance layer 11*a* changes. By detecting the first electrical resistance R1, it is possible to detect the state of the detection target (gas and change in gas concentration).

As described above, in the embodiment, the first electrical resistance R1 changes depending on the state of the detection target when the temperature of the first film portion 11F is increased by the first electric power supplied to the first conductive layer 11*b*.

The detection target exists in the first gap g1. The first electrical resistance R1 changes depending on the state of the detection target between the first base 51*s* and the first film portion 11F.

It has been found that in such a sensor 110, the signal obtained from the first resistance layer 11*a* (the signal corresponding to the first electrical resistance R1) tends to include noise. For example, for rising the temperature, a large current is supplied to the first conductive layer 11*b*. It is considered that noise included in the large current causes noise in the signal obtained from the first resistance layer 11*a*.

In the embodiment, the first conductive member 11*c* is provided between the first resistance layer 11*a* and the first conductive layer 11*b*. The first conductive member 11*c* whose potential is fixed functions as a shield. Thereby, the noise in the signal obtained from the first resistance layer 11*a* is suppressed. As a result, the detection target can be detected with high accuracy. According to the embodiment, it is possible to provide a sensor capable of improving characteristics.

In the embodiment, for example, the first conductive layer current flowing through the first conductive layer 11*b* in the supply of the first electric power is large. Thereby, the first film portion 11F can be effectively heated. On the other hand, the first resistance layer current flowing through the first resistance layer 11*a* in detecting the first electrical resistance R1 is relatively small. For example, the first conductive layer current is greater than the first resistance layer current.

Noise is likely to occur when the first conductive layer current is greater than the first resistance layer current. In the embodiment, even in such a state where noise is likely to occur, noise can be effectively suppressed by providing the first conductive member 11*c*.

For example, the first conductive layer current is not less than 2 times the first resistance layer current. For example, the first conductive layer current may be not less than 5 times the first resistance layer current.

The first conductive member 11*c* may be electrically connected to the first base 51*s*. The first base potential of the first base 51*s* may be substantially the same as the potential of the first conductive member 11*c*.

For example, as shown in FIG. 1, in the first direction D1, the first resistance layer 11*a* may be provided between the first base 51*s* and the first conductive layer 11*b*. By providing the first resistance layer 11*a* between the first base 51*s* and the first conductive layer 11*b* to which the potential is fixed, noise can be further suppressed in the first resistance layer 11*a*.

In the embodiment, it is preferable that the electrical resistance of the first conductive layer 11*b* is low and the electrical resistance of the first resistance layer 11*a* is high. By the resistance of the conductive layer being low, for example, the heater voltage can be lowered. The high resistance of the resistance layer can enhance the sensitivity of the gas sensor, for example.

For example, the first conductive layer 11*b* preferably includes at least one selected from the group consisting of Au, Al, Ti, TiN and Pt. The temperature can be effectively raised.

The first resistance layer 11*a* preferably includes at least one selected from the group consisting of Au, Al, Ti, TiN and Pt. Stable characteristics are easily obtained.

As shown in FIGS. 3A to 3C, a part of the first conductive member 11*c* overlaps the first conductive layer 11*b* and the first resistance layer 11*a* in the first direction D1. Another part of the first conductive member 11*c* may not overlap the first conductive layer 11*b* and the first resistance layer 11*a* in the first direction D1.

For example, at least a part of the outer edge 11*r* of the first conductive member 11*c* is outside the first conductive layer 11*b* and the first resistance layer 11*a* in a plane (e.g., X-Y plane) crossing the first direction D1. For example, in the first film portion 11F, the area of the first conductive member 11*c* is preferably larger than the area of the first conductive layer 11*b* and larger than the area of the first resistance layer 11*a*. Stable shielding effect is obtained.

By the area of the first conductive member 11*c* being large, for example, non-uniformity of temperature in the first film portion 11F is suppressed. High uniformity of temperature is easily obtained.

As shown in FIG. 2B, a width of the first connecting member 21C in a third direction D3 is defined as a first connecting member width w21C. The third direction D3 crosses a plane including the first direction D1 and the second direction D2. The third direction D3 may be, for example, the Y-axis direction. As shown in FIG. 2A, a width of the first film portion 11F in the third direction D3 is defined as a first film portion width w11F. In the embodiment, the first connecting member width w21C is narrower than the first film portion width w11F. For example, heat dissipation via the first connecting member 21C can be suppressed. High sensitivity is easily obtained.

As shown in FIG. 1 and FIG. 3, the first element 10A may further include a first other fixed member 21FA fixed to the first base 51*s*, a first other connecting member 21CA supported by the first other fixed member 21FA. The first other connecting member 21CA supports the first film portion 11F. In this example, the first film portion 11F exists between the first connecting member 21C and the first other connecting member 21CA. The first film portion 11F is supported more stably.

As shown in FIG. 2C, a width of the first other connecting member 21CA in the third direction D3 is defined as a first other connecting member width w21CA. The first other connecting member width w21CA is narrower than the first film width w11F. For example, heat dissipation via the first connecting member 21C can be suppressed. High sensitivity is easily obtained.

As shown in FIG. 1 and FIG. 2A, the first film portion 11F may include a first insulating member 11*i*. The first insulating member 11*i* is provided around the first resistance layer 11*a* and the first conductive member 11*c*.

As shown in FIG. 1, FIG. 2B and FIG. 2C, for example, a part of the first resistance layer 11*a* passes through the first connecting member 21C and the first other connecting member 21CA. For example, a part of the first resistance layer 11*a* is electrically connected to the controller 70 through the first connecting member 21C and the first other connecting member 21CA. For example, a part of the first conductive layer 11*b* extends along the first connecting member 21C and the first other connecting member 21CA. A part of the first conductive layer 11*b* extends along the first connecting member 21C and the first other connecting member 21CA and is electrically connected to the controller 70.

The controller 70 is configured to detect the first electrical resistance R1 by supplying the first electric power to the first conductive layer 11*b* via the first connecting member 21C and the first other connecting member 21CA, for example.

The first conductive member 11*c*, for example, passes through the first connecting member 21C. The first conductive member 11*c* may not pass through the first other connecting member 21CA.

Figure 4:
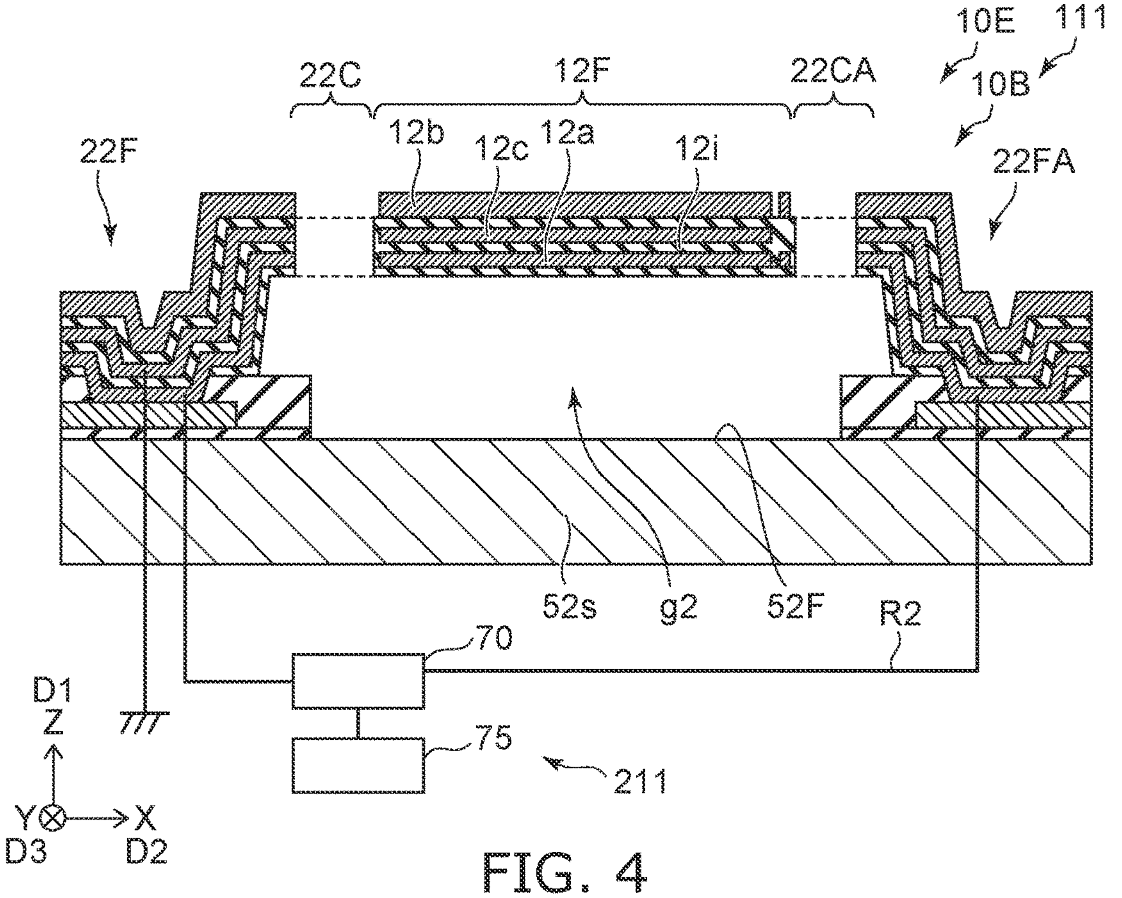
FIG. 4 is a schematic cross-sectional view illustrating a part of a sensor according to the first embodiment.

FIG. 4 is a schematic cross-sectional view illustrating a part of a sensor according to the first embodiment.

As shown in FIG. 4, in a sensor 111 according to the embodiment, the element section 10E includes a second base 52*s* and a second element 10B in addition to the first base 51*s* and the first element 10A (omitted in FIG. 4) described with respect to FIG. 1. In the sensor 111, the configuration of the first base 51*s* and the first element 10A may be similar to those in the sensor 110.

The second element 10B includes a second fixed member 22F fixed to the second base 52*s*, a second connecting member 22C supported by the second fixed member 22F, and a second film portion 12F supported by the second connecting member 22C. The second base 52*s* may be continuous with the first base 51*s*. The boundary between the second base 52*s* and the first base 51*s* may be clear or unclear. The second fixed member 22F is fixed to a second face 52F of the second base 52*s*.

A second gap g2 is provided between the second base 52*s* and the second film portion 12F. The second film portion 12F includes a second resistance layer 12*a*. The controller 70 is configured to output a value corresponding to the difference between the second electrical resistance R2 of the second resistance layer 12*a* and the first electrical resistance R1 (see FIG. 1). The controller 70 includes, for example, a differential amplifier.

The second element 10B is, for example, a reference element. For example, influences such as fluctuations in ambient temperature are suppressed. High accuracy detection is possible.

In this example, the second film portion 12F includes a second conductive layer 12*b*. Power need not be supplied to the second conductive layer 12*b*. The second conductive layer 12*b* may not be used for detection. The second conductive layer 12*b* functions, for example, as a dummy conductive layer.

In this example, the second film portion 12F includes a second conductive member 12*c*. The second conductive member 12*c* is provided, for example, between the second resistance layer 12*a* and the second conductive layer 12*b*. By the shielding effect of the second conductive member 12*c*, noise can be further suppressed in the signal obtained from the second resistance layer 12*a*.

In the embodiment, the second conductive layer 12*b* and the second conductive member 12*c* may be omitted. Alternatively, the configuration of the second element 10B may be substantially the same as the configuration of the first element 10A. The first element 10A and the second element 10B have substantially the same heat capacity and the like, which enables detection with higher accuracy.

In the sensor 111, the second element 10B may further include a second other fixed member 22FA fixed to the second base 52*s* and a second other connecting member 22CA supported by the second other fixed member 22FA. The second other connecting member 22CA supports the second film portion 12F. For example, the second film portion 12F is provided between the second connecting member 22C and the second other connecting member 22CA. The second film portion 12F is supported more stably. The second film portion 12F may include a second insulating member 12*i*.

Second Embodiment

The second embodiment relates to a sensor system. As shown in FIG. 1, the sensor system 210 (see FIG. 1) includes the sensor 110 and the communicator 75. The communicator 75 is configured to transmit a signal corresponding to the change in the first electrical resistance R1. The sensor system 211 (see FIG. 4) includes the sensor 111 and the communicator 75. The communicator 75 is configured to transmit a signal corresponding to the change in the first electrical resistance R1. According to the embodiment, a low noise sensor signal can be acquired from a remote location.

The communicator 75 is configured to supply a signal to the outside by, for example, at least one of wired and wireless methods. The communicator 75 may acquire a control signal from the outside. The controller 70 may be controlled by an external control signal.

The embodiments may include the following configurations (e.g., technical proposals).

Configuration 1

A sensor, comprising:

an element section including a first base and a first element;

the first element including a first fixed member fixed to the first base, a first connecting member supported by the first fixed member, and a first film portion supported by the first connecting member, a second direction from the first fixed member to the first film portion crossing a first direction from the first base to the first fixed member, a first gap being provided between the first base and the first film portion, the first film portion including a first resistance layer, a first conductive layer, and a first conductive member provided between the first resistance layer and the first conductive layer, a potential of the first conductive member being fixed, and a first electrical resistance of the first resistance layer being configured to change according to a state of a detection target around the first element.

Configuration 2

The sensor according to Configuration 1, wherein the first electrical resistance changes depending on the state of the detection target in a state where a temperature of the first film portion is increased by a power supplied to the first conductive layer.

Configuration 3

The sensor according to Configuration 1 or 2, wherein the first electrical resistance changes according to the state of the detection target between the first base and the first film portion.

Configuration 4

The sensor according to any one of Configurations 1-3, wherein in the first direction, the first resistance layer is provided between the first base and the first conductive layer.

Configuration 5

The sensor according to Configuration 4, wherein the first conductive member is electrically connected to the first base.

Configuration 6

The sensor according to Configuration 4, wherein a first base potential of the first base is substantially the same as the potential of the first conductive member.

Configuration 7

The sensor according to any one of Configurations 1-6, wherein a conductivity of the first conductive layer is higher than a conductivity of the first resistance layer.

Configuration 8

The sensor according to any one of Configurations 1-7, wherein the first conductive layer includes at least one selected from the group consisting of Au, Al, Ti, TiN and Pt, and the first resistance layer includes at least one selected from the group consisting of Au, Al, Ti, TiN and Pt.

Configuration 9

The sensor according to any one of Configurations 1-8, wherein a part of the first conductive member overlaps the first conductive layer and the first resistance layer in the first direction, and another part of the first conductive member does not overlap the first conductive layer and the first resistance layer in the first direction.

Configuration 10

The sensor according to any one of Configurations 1-8, wherein at least a part of an outer edge of the first conductive member is outside the first conductive layer and the first resistive layer in a plane crossing the first direction.

Configuration 11

The sensor according to any one of Configurations 1-10, wherein a first connecting member width of the first connecting member in a third direction crossing a plane including the first direction and the second direction is narrower than a first film portion width of the first film portion in the third direction.

Configuration 12

The sensor according to any one of Configurations 1-11, wherein the first element further includes a first other fixed member fixed to the first base, and a first other connecting member supported by the first other fixed member, and the first other connecting member supports the first film portion.

Configuration 13

The sensor according to Configuration 12, further comprising:

a controller, a part of the first resistance layer being electrically connected to the controller through the first connecting member and the first other connecting member, a part of the first conductive layer extending along the first connecting member and the first other connecting member and being electrically connected to the controller, and the controller being configured to supply a first electric power to the first conductive layer and to detect the first electrical resistance.

Configuration 14

The sensor according to Configuration 13, wherein the first conductive member passes through the first connecting member and does not pass through the first other connecting member.

Configuration 15

The sensor according to any one of Configurations 1-11, further comprising:

a controller, a part of the first resistance layer being electrically connected to the controller through the first connecting member, a part of the first conductive layer extending along the first connecting member and being electrically connected to the controller, and the controller being configured to supply a first electric power to the first conductive layer and to detect the first electrical resistance.

Configuration 16

The sensor according to Configuration 1, further comprising:

a controller, the controller being configured to supply a first electric power to the first conductive layer and to detect the first electrical resistance.

Configuration 17

The sensor according to Configuration 16, wherein a first conductive layer current flowing in the first conductive layer in supplying the first electric power is greater than a first resistance layer current flowing in the first resistance layer in detecting the first electrical resistance.

Configuration 18

The sensor according to Configuration 17, wherein the first conductive layer current is not less than 2 times the first resistance layer current.

Configuration 19

The sensor according to any one of Configurations 16-18, wherein the element section further includes a second base and a second element, the second element includes a second fixed member fixed to the second base, a second connecting member supported by the second fixed member, and a second film portion supported by the second connecting member, a second gap is provided between the second base and the second film, the second film portion includes a second resistance layer, and the controller is configured to output a value corresponding to a difference between a second electrical resistance of the second resistance layer and the first electrical resistance.

Configuration 20

A sensor system, comprising:

the sensor according to Configuration 1; and a communicator configured to transmit a signal corresponding to the change in the first electrical resistance.

According to the embodiments, a sensor and a sensor system capable of improving characteristics can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors and sensor systems such as, bases, element sections, fixed members, connecting members, film portions, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors and all sensor systems practicable by an appropriate design modification by one skilled in the art based on the sensors and the sensor systems described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:

an element section including a first base and a first element;

the first element including a first fixed member fixed to the first base, a first connecting member supported by the first fixed member, and a first film portion supported by the first connecting member, a first direction from the first base to the first fixed member crossing a second direction from the first fixed member to the first film portion, a first gap being provided between the first base and the first film portion, the first film portion including a first resistance layer, a first conductive layer, and a first conductive member provided between the first resistance layer and the first conductive layer, a potential of the first conductive member being fixed, and a first electrical resistance of the first resistance layer being configured to change according to a state of a detection target around the first element.

2. The sensor according to claim 1, wherein the first electrical resistance changes depending on the state of the detection target in a state where a temperature of the first film portion is increased by a power supplied to the first conductive layer.

3. The sensor according to claim 1, wherein the first electrical resistance changes according to the state of the detection target between the first base and the first film portion.

4. The sensor according to claim 1, wherein in the first direction, the first resistance layer is provided between the first base and the first conductive layer.

5. The sensor according to claim 4, wherein the first conductive member is electrically connected to the first base.

6. The sensor according to claim 4, wherein a first base potential of the first base is substantially the same as the potential of the first conductive member.

7. The sensor according to claim 1, wherein a conductivity of the first conductive layer is higher than a conductivity of the first resistance layer.

8. The sensor according to claim 1, wherein the first conductive layer includes at least one selected from the group consisting of Au, Al, Ti, TiN and Pt, and the first resistance layer includes at least one selected from the group consisting of Au, Al, Ti, TiN and Pt.

9. The sensor according to claim 1, wherein a part of the first conductive member overlaps the first conductive layer and the first resistance layer in the first direction, and another part of the first conductive member does not overlap the first conductive layer and the first resistance layer in the first direction.

10. The sensor according to claim 1, wherein at least a part of an outer edge of the first conductive member is outside the first conductive layer and the first resistive layer in a plane crossing the first direction.

11. The sensor according to claim 1, wherein a first connecting member width of the first connecting member in a third direction crossing a plane including the first direction and the second direction is narrower than a first film portion width of the first film portion in the third direction.

12. The sensor according to claim 1, wherein the first element further includes a first other fixed member fixed to the first base, and a first other connecting member supported by the first other fixed member, and the first other connecting member supports the first film portion.

13. The sensor according to claim 12, further comprising:

a controller, a part of the first resistance layer being electrically connected to the controller through the first connecting member and the first other connecting member, a part of the first conductive layer extending along the first connecting member and the first other connecting member and being electrically connected to the controller, and the controller being configured to supply a first electric power to the first conductive layer and to detect the first electrical resistance.

14. The sensor according to claim 13, wherein the first conductive member passes through the first connecting member and does not pass through the first other connecting member.

15. The sensor according to claim 1, further comprising:

a controller, a part of the first resistance layer being electrically connected to the controller through the first connecting member, a part of the first conductive layer extending along the first connecting member and being electrically connected to the controller, and the controller being configured to supply a first electric power to the first conductive layer and to detect the first electrical resistance.

16. The sensor according to claim 1, further comprising:

a controller, the controller being configured to supply a first electric power to the first conductive layer and detecting the first electrical resistance.

17. The sensor according to claim 16, wherein a first conductive layer current flowing in the first conductive layer in supplying the first electric power is greater than a first resistance layer current flowing in the first resistance layer in detecting the first electrical resistance.

18. The sensor according to claim 17, wherein the first conductive layer current is not less than 2 times the first resistance layer current.

19. The sensor according to claim 16, wherein the element section further includes a second base and a second element, the second element includes a second fixed member fixed to the second base, a second connecting member supported by the second fixed member, and a second film portion supported by the second connecting member, a second gap is provided between the second base and the second film, the second film portion includes a second resistance layer, and the controller is configured to output a value corresponding to a difference between a second electrical resistance of the second resistance layer and the first electrical resistance.

20. A sensor system, comprising:

the sensor according to claim 1; and a communicator configured to transmit a signal corresponding to the change in the first electrical resistance.

* * * * *